United States Patent [19]

Eggleston

[11] 4,327,462
[45] May 4, 1982

[54] MULTI-WHEEL BED ROLLER

[75] Inventor: David O. Eggleston, Mishawaka, Ind.

[73] Assignee: Shepherd Products U.S. Inc., St. Joseph, Mich.

[21] Appl. No.: 194,378

[22] Filed: Oct. 6, 1980

[51] Int. Cl.³ .............................................. A47B 91/00
[52] U.S. Cl. ........................................................... 16/47
[58] Field of Search ..................... 16/47, 18 R, 44, 45, 16/18 CG, 46, 41

[56] References Cited

U.S. PATENT DOCUMENTS

| 2,163,850 | 6/1939 | Pfister | 16/44 |
| 2,713,179 | 7/1955 | Clifton | 16/47 |
| 3,140,506 | 7/1964 | Arenson | 16/47 |
| 3,724,022 | 4/1973 | Alberti et al. | 16/45 |

FOREIGN PATENT DOCUMENTS 925081 5/1963 United Kingdom .................... 16/47

Primary Examiner—Doris L. Troutman
Attorney, Agent, or Firm—McWilliams, Mann & Zummer

[57] ABSTRACT

A bed roller having three wheels disposed respectively between the depending flanges of an inverted U-shaped horn frame and upon respectively outer sides of the horn frame flanges all having conforming tread portions and the outer side wheels having smooth outer sides with the horn frame swivel mounted by means of an upwardly disposed stem. The wheels are freely mounted on an axle extending through the flanges of the horn frame so that they may rotate forwardly or rearwardly as the horn frame swivels about the vertical stem.

3 Claims, 3 Drawing Figures

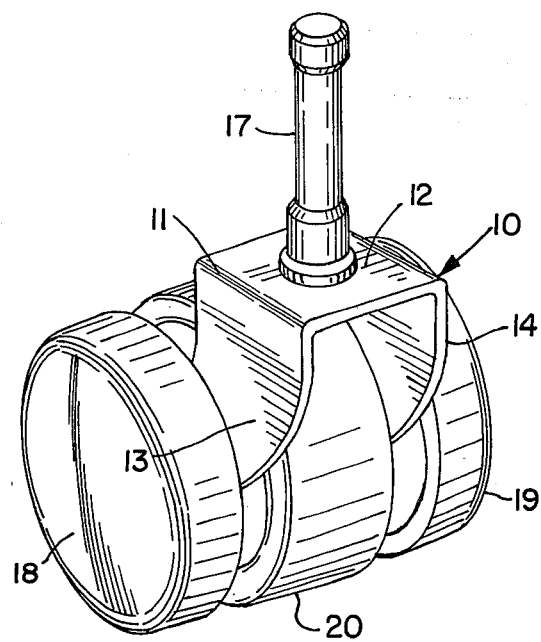
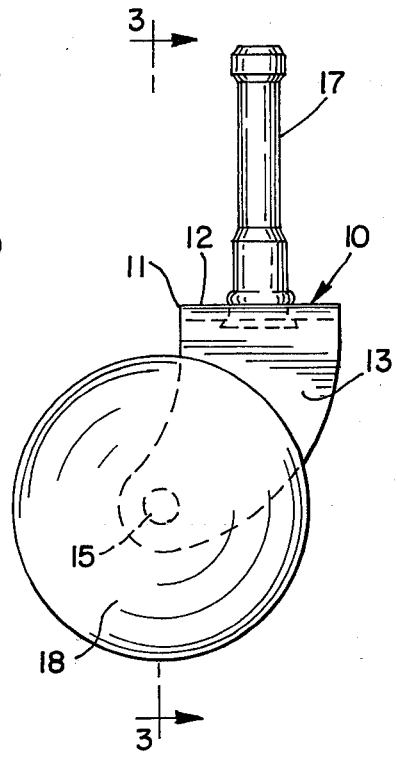
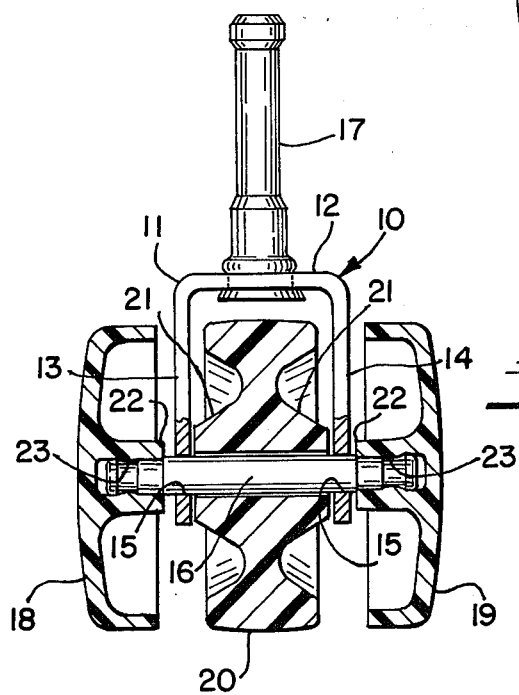

# MULTI-WHEEL BED ROLLER

BACKGROUND OF THE INVENTION

Heretofore, bed rollers have taken various forms from an ordinary type furniture caster to massive oversize rollers intended to take the heavier loads ordinarily imposed by a bed, especially the larger size beds so widely used today. Some prior casters of the larger type, such as U.S. Pat. No. 1,432,966, involved the use of string guards to avoid picking strings, or threads, as from a bedroom rug, or carpet. Certain prior casters especially designed for use under beds, such as in U.S. Pat. No. 2,964,778, utilized exceedingly wide rollers for the necessary support and to minimize excessive wear on floor coverings caused by frequent moving of the bed.

Two wheel casters are utilized by patents such s Ger. No. 25 13 565 and U.S. Pat. Nos. 3,822,437 and 3,805,320 as well as 3,648,325 and 4,077,088. A six wheel dolly caster was disclosed U.S. Pat. No. 2,713,179 but this device was more in the nature of a truck designed to cope with excessively large and very heavy loads, such as safes, machinery, crates and the like.

This latter arrangement utilized three wheels forward and three wheels to the rear with the wheels tracking the same paths and mounted by means of longitudinal supporting plates at opposite sides of all of the wheels and mounted on upper horizontal hinge pin extending through depending lugs on a rectangular body plate which has relative movement with respect to a top steering plate with means for slight angling movements so that a heavy load may be sterred to some extent.

U.S. Pat. No. 3,140,506 discloses a roller arrangement having peripheral surfaces designed to avoid the forming of depressed areas in the pile of a carpet, or rug upon which the caster supports an article of furniture and involves the use of multiple discs and radially extending fingers between the discs with both the discs and the fingers separating the pile fibers to pass therebetween without matting them down.

SUMMARY OF THE INVENTION

This invention avoids the complexities of prior devices in this field and provides a simplified but very strong bed roller adapted for fully supporting a bed, or other article of furniture, and which utilizes multiple rollers for adequate support of the bed without undue pressure per square inch on a supporting surface covered by a carpet, or rug.

The invention uses three rollers on each bed support and mounts these rollers on a single axle in such manner that the middle roller is mounted between the depending flanges of an inverted U-shaped horn frame and the remaining two rollers are mounted respectively at the outer sides of the flanges so that each flange is disposed between the middle roller and a related outer roller with the axle extending through the middle roller and through the two flanges of the frame with the outer rollers each mounted on an opposite end of the axle and having outer surfaces which taken with the thread portions thereof and the thread portions of the middle roller present a roller assembly having the finished appearance of a unit.

The inverted U-shaped frame transmits the load imposed by the bed equally to all three rollers so that the load on the supporting surface beneath the roller is evenly distributed with each flange of the U-shaped frame being supported more or less equally by the middle roller and one of the outer rollers whereby no excess stress is imposed on any of the rollers or on either one of the frame flanges.

OBJECTS OF THE INVENTION

The primary purpose of this invention is to provide a roller support designed for heavy furniture articles such as a bed and which utilizes multiple wheels on each support.

The principal object of the invention is the provision of a multi-wheel bed support having three wheels on a single axle with the middle wheel and one associated wheel equally supporting each side of the bed support.

An important object of the invention is to provide a three wheel bed support having an inverted U-shaped horn frame with one flange of the frame at each side disposed between a middle wheel and a related side wheel with an axle mounting all three wheels in the depending flanges of the frame.

A further object of the invention is the provision of a three wheel bed supporting device wherein the three wheels are mounted on a single axle for freely independent rotation on the axle and having a supporting frame portion disposed between the middle wheel and each related side wheel.

DESCRIPTION OF THE DRAWINGS

The foregoing and other and more specific objects of the invention are attained by the wheel support structure and arrangement illustrated in the accompanying drawings wherein FIG. 1 is a general perspective view of a bed roller assembly constructed in accordance with this invention;

FIG. 2 is a side elevational view of the bed roller assembly; and

FIG. 3 is a transverse sectional view through the bed roller assembly taken on the line 3—3 of FIG. 2.

DESCRIPTION OF PREFERRED EMBODIMENT

In the drawings the reference character 10 represents the bed roller assembly and the reference 11 refers to the horn frame in which the supporting rollers are mounted. The horn frame 11 comprises an inverted U-shaped rigid body member forming the basic structure upon which all of the associated parts are mounted. The horn frame includes a horizontal top web plate portion 12 and integral depending side flanges 13 and 14 each provided with an opening 15 forming horizontally aligned bearings for an axle 16. A vertical stem 17 is rigidly mounted in the web 12 and extends upwardly from the web for entry into an appropriate socket of a bed frame, or other article of furniture. The stem 17 swivels in such socket whereby the roller assembly 10 may have swivelling movements relative to a bed, or the like.

This bed roller assembly includes three roller wheels 18, 19 and 20 all mounted on the axle 16. The axle 16 is mounted in the bearings 15 in the respective flanges 13 and 14 of the horn 11 and are so disposed relative to these depending flanges that the supporting loads of the three wheels are equally distributed between the two bearings 15. The flange 13 engages the axle 16 between the outer wheel 18 and the middle wheel 20 while the depending flange 14 engages the axle 16 between the outer wheel 19 and the middle wheel 20. The width of the wheel 20 is equal to the combined widths of the wheels 18 and 19 so that the bearing loads imposed at the respective horn frame flanges 13 and 14 are substantially the same.

In putting this roller assembly together the middle roller wheel 20 is disposed between the flanges 13 and 14 and the axle 16 is inserted through the bearings 15 and the wheel so that the opposite ends of the axle then project beyond the respective flanges 13 and 14. The oppositely extending hubs 21 of the middle wheel project beyond the plane of the opposite side faces of the wheel 20 such that the hubs fit between the inner faces of the flanges 13 and 14 with the side faces of the wheel spaced from such inner faces. The outer wheels 18 and 19 each have a central hub 22 which extends only toward the inner side of each wheel and project beyond the inner plane of the wheel so that when the wheels are assembled on the axle 16 the inner faces of the wheels are spaced from the outer faces of the flanges 13 and 14 with the inner ends of the hubs 22 fitted relatively to the flanges on their outer sides substantially similar to the hubs 21 on the inner sides.

With the middle wheel 20 mounted on the axle 16 and disposed between the flanges 13 and 14 of the horn frame 11 the ends of the axle project beyond the flanges at opposite sides and the other wheels 18 and 19 are aligned with the axle with the hubs 22 entered over the axle ends and are then simultaneously pressed onto the axle so that the assembled relationship of the three roller wheels is established. It will be noted that the hubs 22 each have an inner detent 23 and the axle 16 has a detent 24 at each end so that when the wheels 18 and 19 are pressed onto the axle these detents act to hold the wheels on the axle and thus maintain the bed roller assembly.

The roller wheels 18 and 19 have smooth outer faces, fully closed, so that the axle is not visible from either end and the diameters of all three roller wheels is substantially similar so that in viewing the assembly it not only presents a smooth well designed appearance but gives the effect of a unified bed roller arrangement that has great supporting strength and will roll easily over surfaces that might otherwise be difficult to move over such as carpet, or a rug.

The bed roller assembly 10 is designed to swivel about the vertical axis of the mounting stem 17 which is facilitated, of course, by the horizontally offset positioning of the axle 16 relative to the vertical axis of the stem 17 as best indicated in FIG. 2 and the wheels 18, 19 and 20 are all mounted on the axle 16 for freely rotating relationship whereby as the roller assembly swivels about the mounting stem 17 the several wheels are free to rotate either forward or back in response to swivelling movements so that there will not be any resistance to such movements regardless of how a bed supported thereby might be moved.

From the foregoing, it will be seen that a unique multi-wheel bed roller assembly has been provided wherein the three wheels are utilized on a single axle with one wheel mounted between the depending flanges of a horn frame and a smooth sided outer wheel is mounted outwardly of the respective flanges to provide a unified design for a bed roller of exceptional strength and ease of operation.

What is claimed is:

1. A multi-wheel bed roller comprising an inverted U-shaped swivel mounted horn frame including spaced apart side flanges depending from a horizontal top web plate, a swivel mounting stem extending upwardly from the web plate, horizontally aligned bearings in said flanges, a horizontal axle extending through said bearings, a single supporting roller wheel mounted centrally on said axle between said flanges, and a pair of separate supporting roller wheels mounted respectively at opposite ends of said axle at the respectively outer sides of said respective side flanges.

2. A multi-wheel bed roller as set forth in claim 1 wherein the horizontal axis of said axle is offset from the vertical axis of said stem whereby all of said roller wheels may swivel about said vertical axis, and said roller wheels are each rotatably mounted on said axle whereby the wheels may revolve freely either fowardly or rearwardly as they swivel about said stem.

3. A multi-wheel bed roller as set forth in claim 2 wherein said wheels outwardly of said side flanges have smooth outer surfaces and the tread surfaces thereof conform to the tread surface of said wheel between the side flanges.

* * * * *